US008973283B2

(12) United States Patent
Nandi et al.

(10) Patent No.: US 8,973,283 B2
(45) Date of Patent: Mar. 10, 2015

(54) SYSTEM AND METHOD FOR SOLVENT RECOVERY IN A BATCH FLUIDIZED BED PROCESS

(75) Inventors: Arup Nandi, Karnataka (IN); Alan Cheng, Naperville, IL (US); John Fredric Billingham, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 812 days.

(21) Appl. No.: 13/142,061

(22) PCT Filed: Feb. 2, 2010

(86) PCT No.: PCT/US2010/022803
§ 371 (c)(1),
(2), (4) Date: Jun. 24, 2011

(87) PCT Pub. No.: WO2010/090979
PCT Pub. Date: Aug. 12, 2010

(65) Prior Publication Data
US 2012/0030962 A1    Feb. 9, 2012

Related U.S. Application Data

(60) Provisional application No. 61/149,425, filed on Feb. 3, 2009.

(51) Int. Cl.
| | |
|---|---|
| *F26B 5/06* | (2006.01) |
| *B01D 53/00* | (2006.01) |
| *B01D 53/26* | (2006.01) |
| *F26B 3/08* | (2006.01) |
| *F26B 21/14* | (2006.01) |
| *F26B 25/00* | (2006.01) |

(52) U.S. Cl.
CPC ............ *B01D 53/002* (2013.01); *B01D 53/265* (2013.01); *B01D 2257/2064* (2013.01);
(Continued)

(58) Field of Classification Search
CPC ............ D06F 58/28; D06F 2058/2838; D06F 43/086; D06F 58/10; F26B 7/00; F26B 25/006; F26B 3/08; F26B 21/14; F26B 3/00; F26B 23/001; F26B 23/002; F26B 21/086; F26B 17/122; A01N 25/34; A01N 65/00; B01D 53/002; B01D 53/265; B01D 2257/2064; B01D 2257/7022; B01D 5/0072; B01D 5/0093; B01D 5/0081; B01D 2257/7027; B01D 2257/708; B01D 2257/80; B01D 2257/704; B01J 2/16; C07C 51/25; C07C 51/215
USPC ............... 34/282, 524, 201, 523, 74, 77, 165, 34/513, 514, 364; 562/548, 549
See application file for complete search history.

(56) References Cited

U.S. PATENT DOCUMENTS 3,714,719 A * 2/1973 Wayne ............................. 34/74
(Continued)

FOREIGN PATENT DOCUMENTS

WO    WO 2006/052664 A2    5/2006

*Primary Examiner* — Kenneth Rinehart
*Assistant Examiner* — Bao D Nguyen
(74) *Attorney, Agent, or Firm* — Robert J. Hampsch

(57) ABSTRACT

A system and method for solvent recovery in a batch fluidized bed process is provided. The disclosed embodiment of the fluidized bed system includes a fluidized bed vessel adapted to contain a batch of solvent-containing product; an influent or intake circuit adapted to supply an inert fluidizing gas to the fluidized bed vessel; an effluent circuit adapted to remove the solvent containing inert fluidizing gas from the fluidized bed vessel; a first recycle circuit coupling the effluent circuit to a solvent recovery means; a second recycle circuit directly coupling the effluent circuit to the intake circuit and a flow control valve operatively disposed to divide the effluent between the first recycle circuit and the second recycle circuit based on the operating regime of the fluidized bed process. The disclosed embodiments further include a source of liquid nitrogen coupled to the second recycle circuit to provide the make-up inert gas as well as provide enhanced cooling of the effluent based on the operating regime of the fluidized bed process.

5 Claims, 2 Drawing Sheets

(52) U.S. Cl.
CPC . *B01D2257/7022* (2013.01); *B01D 2257/7027* (2013.01); *B01D 2257/704* (2013.01); *B01D 2257/708* (2013.01); *B01D 2257/80* (2013.01); *F26B 3/08* (2013.01); *F26B 21/14* (2013.01); *F26B 25/006* (2013.01)
USPC .................. 34/282; 34/74; 34/77; 34/364

(56) References Cited

U.S. PATENT DOCUMENTS

| | | | | |
|---|---|---|---|---|
| 4,145,818 | A | * | 3/1979 | Kulling .................. 34/364 |
| 4,469,720 | A | * | 9/1984 | Morris .................. 427/345 |
| 7,189,871 | B2 | | 3/2007 | Fiorentino et al. |

\* cited by examiner

SYSTEM AND METHOD FOR SOLVENT RECOVERY IN A BATCH FLUIDIZED BED PROCESS

RELATED APPLICATION

This application claims the benefit of U.S. Provisional Application Ser. No. 61/149,425, filed on Feb. 3, 2009, and further claims the benefit of International Application No. PCT/US2010/022803, filed on Feb. 2, 2010, which are incorporated herein by reference.

FIELD OF THE INVENTION

The present invention relates to a batch fluidized bed process, and more particularly to a system and method of solvent recovery in batch fluidized bed drying processes.

BACKGROUND

A fluidized bed process is a process such as mixing, agglomerating, granulating, pelletization, coating, drying or cooling wherein a bed of solid particles disposed in a vessel with a stream of air or gas passing upward through the particles at a rate great enough to set the solid particles in motion and affect the desired process. Typically, pressurized air or gas enters the fluidized bed vessel through numerous holes in a distributor plate at the bottom of the fluidized bed. The air or gas stream flows upward through the bed, causing the solid particles to be suspended in the stream while the desired process is on-going. Batch fluidized bed processing allows several process steps (e.g. mixing, drying, cooling, etc.) to be carried out in a single vessel or unit. The batch fluidized bed process assures uniformity of all product within a batch.

In a batch fluidized bed drying process, a heated stream of air flows up through the wet product disposed in a vessel and removes solvent from the wet product leaving a dryer, less dense particle without affecting the elemental nature of the product. While an air-blown Fluidized Bed Dryer (FBD) is typically an easy to operate and low cost option for drying many chemical or pharmaceutical products, there are notable disadvantages to using an air-blown FBD. For example, air blown FBDs are generally unsuitable for drying products that are sensitive to the moisture, impurities or oxygen contained within the air stream and unsuitable for drying products containing organic or flammable solvents. Specifically, there are many chemical and pharmaceutical products that tend to degrade when exposed to the oxygen or moisture contained in the drying air. In addition, there are many safety concerns associated with the introduction of oxygen during the drying process of various chemical or pharmaceutical products as the organic solvents from the wet product may be volatile in nature and may actually form combustible mixtures when exposed to the oxygen in the drying air. Other disadvantages associated with an air-blown FBD are the difficulty and expense of recovering the solvent from the air stream that was extracted during the drying process.

An alternative to an air-blown FBD is to use an inert gas or moisture free fluidizing atmosphere in lieu of standard air for drying the chemical or pharmaceutical products. For example, fluidized bed drying processes that use an organic solvent typically require an inert gas, such as nitrogen, to replace the air as the medium of fluidization. However, using the inert gas atmospheres are significantly more expensive than using standard air and thus, recycling of the inert fluidizing gas is an adopted practice. Recycling of the inert fluidizing gas typically requires removal of the volatile solvents and other impurities picked up by the gas stream during the drying of the product. Existing FBD systems have used nitrogen gas as the inert fluidizing gas and a solvent removal process downstream of the drying vessel or tank to continuously remove the solvent from the entire stream exiting the FBD with the solvent-free or purified nitrogen gas being recirculated or recycled back to the FBD. Unfortunately, due to the high flow rate of the inert gas both into and from the FBD, the cost and size of the solvent recovery system presents significant economic disadvantages to using inert gas blown FBD to dry many chemical and pharmaceutical products.

Another alternative to using an air-blown FBD or inert gas blown FBD is to a vacuum drier. In about 1989, the first vacuum fluidized bed system was presented wherein a fluidized bed was generated and sustained under vacuum conditions, thereby eliminating the need for the inert gas. In fact, vacuum driers are currently used today for many product drying applications where the products are sensitive to the moisture, impurities or oxygen or applications where the solvents are highly volatile and flammable. Unfortunately, vacuum driers are very expensive both from a capital expense standpoint as well as an operating cost standpoint. Also, most drying process that use vacuum driers have much longer drying times than an air-blown FBD or inert gas blown FBD. Also, solvent recovery in a vacuum drier based drying process is a more difficult and more expensive proposition compared to solvent recovery in either air-blown or nitrogen blown FBD systems. Although vacuum systems can lower the boiling point of the solvent to be removed, a vacuum environment can insulate the thermal heat transfer and inhibit mass transfer in bulk without a carrier gas. Due to the difficulties to keep seals from leaking thru rotating equipment, vacuum driers seldom has ability to agitate the powders, resulting in poor heat and mass transfer efficiencies.

What is needed therefore is an economically attractive and cost-effective solution for batch fluidized bed processing of products in an inert environment that allows for the efficient recovery of solvents. Such solution demands reductions in both operating costs of the batch fluidized bed process and the associated capital costs (i.e. size of equipment) compared to existing solutions without adverse impact to process cycles or times.

SUMMARY OF THE INVENTION

The present invention may be characterized as a method of fluidizing a batch of solvent-containing product in a fluidized bed vessel comprising the steps of: (i) directing an influent stream containing an inert fluidizing gas through the fluidized bed vessel to treat the batch of product and produce an effluent stream of inert fluidizing gas with solvent entrained therein; (ii) diverting a first portion of the solvent entrained effluent stream to a solvent recovery process to remove solvent from the first portion of the solvent entrained effluent stream to form a cleansed effluent stream; (iii) recycling a second portion of the solvent entrained effluent stream to the influent stream; (iv) directing the cleansed effluent stream to the influent stream; and (v) providing a make-up stream of inert fluidizing gas to the cleansed effluent stream or influent stream.

The present invention may be also characterized as a fluidized bed system comprising: a fluidized bed vessel adapted to contain a batch of solvent-containing product; an influent circuit adapted to supply an inert fluidizing gas to the fluidized bed vessel; an effluent circuit adapted to remove the inert fluidizing gas with solvent entrained therein from the fluidized bed vessel; a first recycle circuit coupling the effluent circuit to a solvent recovery means and the solvent recovery means to the influent circuit; a second recycle circuit directly coupling the effluent circuit to the influent circuit; a flow control valve disposed in the effluent circuit and operatively disposed to divide the effluent between the first recycle circuit and the second recycle circuit in response to commands from a controller; and a source of inert fluidizing gas coupled to the second recycle circuit or influent circuit.

BRIEF DESCRIPTION OF THE DRAWINGS

The above and other aspects, features, and advantages of the present invention will be more apparent from the following, more detailed description thereof, presented in conjunction with the following drawings, wherein.

DETAILED DESCRIPTION

The present system and method of fluidized bed drying s are based, in part, on realizing the difference between the gas flow required to fully fluidize a bed of power or particulates verses the gas flow required for drying, and the need to purge out infiltrated air. The gas flow rate for complete fluidization has to high enough at which the drag force exerted by the gas is greater than the apparent weight of the particles in the bed. Turbulent mixing of the fully fluidized particles provides the superior heat and mass transfer between the bulk of the gas and the solid particles. The drying process, on the other hand, is limited by the slower process of evaporation and diffusion of the solvent molecules through the momentum boundary layer to the gas phase. The drying process is further limited by the rate at which the solvent may have to be diffused through the micro-pores of the solid particles to the solid-gas interface.

Realizing these differences, the present method of involves recycling fluidizing gases in batch fluidized bed systems, such as fluidized bed driers, using a split stream recovery method in the recycle loop. By splitting the off-gas stream into two streams, only a first portion of the recycling gas stream passes through a solvent recovery process at which the solvent is knocked out or recovered using adsorption, absorption or more preferably thru a solvent condensation step. After most of the solvent is removed, this first gas stream is returned to the fluidized bed dryer. The second portion of the recycling stream, without solvent recovery, is returned directly to the fluidized bed dryer by mixing this second gas stream with the purified or first stream. Therefore, the size and cost of the gas handling equipment for the solvent removal can be reduced substantially while the fluidized bed can still see the full amount of gas needed for fluidization. If a solvent condensation process is used, less cryogen is needed to cool the inert gas stream and less heating is needed to bring the recycle temperature back to the desirable drying gas temperatures.

A third stream is also disclosed as part of the present solvent recovery process. This third stream includes a portion of the untreated recycling stream or a portion of the treated recycling stream or both are purged off or vented to prevent oxygen content from building up in the system. The oxygen concentration changes when air infiltrates into the closed recycling loop. Equal amount of fresh nitrogen or other inert gas is supplied to the present system and process to make-up the loss from the purge or vented gas.

Figure 1:
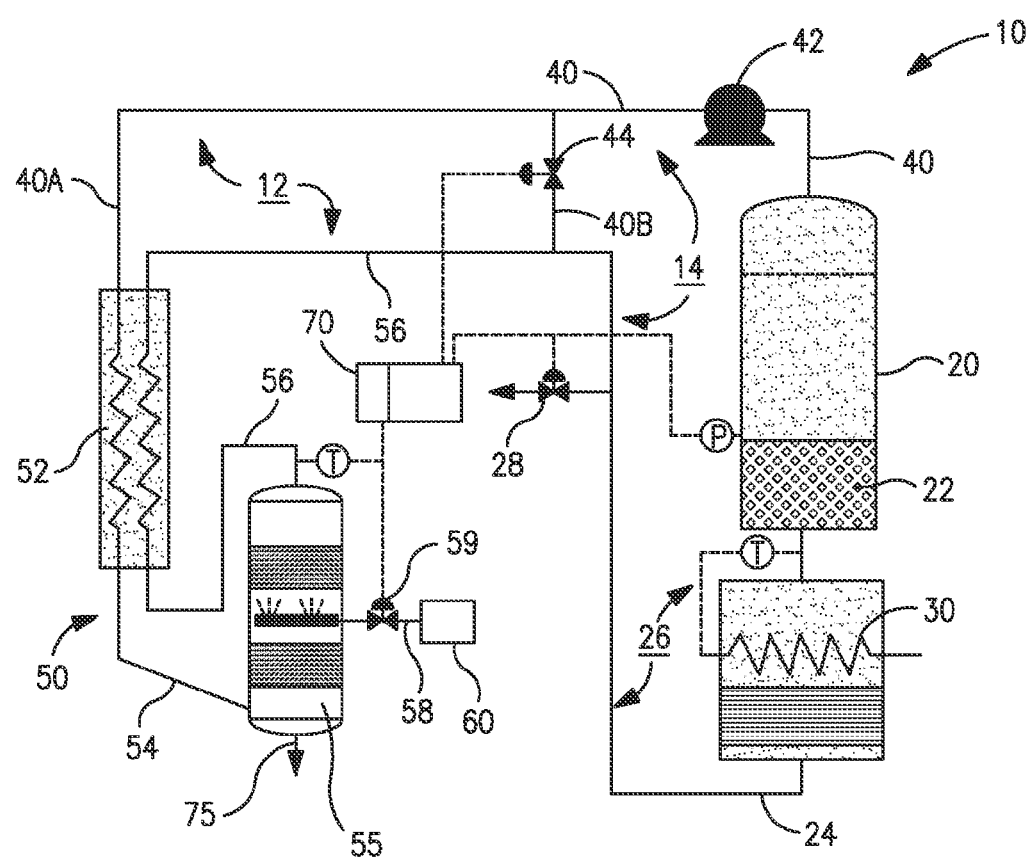
FIG. 1 is a schematic illustration of the fluidized bed system in accordance with an embodiment of the present invention.

Turning now to FIG. 1, there is shown a schematic illustration of an inert gas based batch fluidized bed dryer system 10 utilizing both a solvent recovery and recycle loop or circuit 12 in conjunction with a direct recycle loop or circuit 14 in accordance with an embodiment of the present invention. In particular, FIG. 1 illustrates a batch fluidized bed drying system 10 that facilitates the use of a new process gas flow and control strategy that allows reduction in both the size (i.e. footprint) of the fluidized bed drying system 10 and the associated capital cost as compared to conventional existing air blown FBD systems, vacuum based FBD systems, or fully recycled inert gas FBD systems. The fluidized bed system footprint and associated capital cost reductions are achieved without significant increase in product drying times.

The illustrated batch fluidized bed system 10 includes a fluidized bed vessel 20 adapted to contain a batch of wet solvent-containing product 22. An inert fluidizing gas 24 such as nitrogen, argon, or helium is supplied to the fluidized bed vessel 20 via the intake 26 where it fluidizes the wet solvent-containing product 22 and, if appropriate, reacts therewith. The conditions in the fluidized bed vessel 20, including pressure, gas flow rate, temperature, etc. are monitored and fed to the system controller (70) to operative control various aspects of the system 10, as described in more detail below. The intake circuit 26 to the fluidized bed vessel 20 includes vent 28 responsive to the pressure in the fluidized bed vessel 20, a heating chamber 30 adapted to heat the inert fluidizing gas 24 in the intake 26 to a prescribed temperature set point ($T_{SP1}$) or range.

In the case of fluidized bed drying, the effluent 40 leaving the fluidized bed vessel 20 via pump 42 is the inert fluidizing gas with a portion of the solvent entrained therein. Upon exiting the fluidized bed vessel 20, the effluent 40 is split into two separate circuits by means of a flow control valve 44. The first circuit is a solvent recovery and recycle circuit 12 which routes the effluent 40 to a solvent recovery process or sub-system 50 and subsequently returns the treated effluent 52 back to the intake 26 of the fluidized bed vessel 20. The second circuit is a direct recycle circuit 14 that routes a portion of the solvent containing gas or effluent 40 directly to the intake 26 of the fluidized bed vessel 20. The relative portions of effluent 40 flowing to the direct recycle circuit 14 and the solvent recovery and recycle circuit 12 is operatively set by a microprocessor based controller (70) in response to various measured parameters of the fluidized bed system 10 and the stage of the process ongoing in the fluidized bed vessel 20.

The illustrated embodiment of the solvent recovery sub-system 50 preferably includes a vertical heat exchanger 52 where a portion of the effluent 40A is initially cooled via the recycled stream. The cooled effluent stream 54 is then directed to a condensing unit 55 where solvent is removed from the inert carrier gas and make-up inert gas 58 is added from a source of inert gas 60, preferably a liquid source of the inert gas. As the solvent condenses out of the cooled effluent stream 54, the cleansed or treated effluent stream 56 together with any needed make-up gas 58 is recycled to the vertical heat exchanger 52 as the source of cooling and subsequently to the intake 26. The amount of make-up gas 58 added to the system is ascertained or calculated based on the temperature of the gas stream exiting the condenser and that is used to cool the effluent 40A during the solvent recovery process.

As can be appreciated in the embodiment of FIG. 1, the refrigeration or cooling capacity associated with the liquid source 60 of make-up inert fluidizing gas 58 is used to cool the effluent 40A in the solvent recovery and recycle circuit 12 to facilitate removal of some part of the solvent load prior to reintroducing such stream back to the FBD. By cooling the effluent 40A, the amount of solvent that can be recovered is increased with each pass through the condensing unit 55 and also helps remove any moisture arising from air entrainment in the effluent 40A. Because, a portion of the recycled effluent 40A is cooled, the gas stream exiting the condenser is preferably reheated prior to a return to the intake 26 and introduction into the fluidized bed vessel 20.

Because the effluent 40 is split into a plurality of recycle streams 40A, 40B and each recycle stream flows at volumetric flow rates lower than the volumetric flow rate through the fluidized bed vessel 20, the gas handling equipment within the recycle circuits including valves, heat exchangers, condensers, etc. are smaller and generally less expensive. In the preferred arrangement, only a part of the effluent is directed through the solvent recovery and recycle loop 12. The percentage of effluent 40A directed through the solvent recovery and recycle loop 12 is generally between about 1% to 80% of the total effluent 40 and such percentage is preferably adjusted during the drying process based on the operating regime of the fluidized bed system 10. Notwithstanding the reduced volumetric flow rates in the solvent recovery and recycle loop or circuit 12, the cycle times for drying a given wet product 22 down to a prescribed solvent content is not significantly increased compared to a fluidized bed system where the entire effluent is treated for solvent removal (i.e. purified) and recycled back to fluidized bed vessel 20.

Most batch fluidized bed drying operations have three regimes of operation, including Regime 1 where the rate of solvent pickup rate (i.e. mass of solvent picked up and carried away by the fluidizing gas per unit time) is highest and therefore the degree of saturation of the fluidizing gas with solvent is also the highest. Regime 1 is typically the initial operating mode of the fluidized bed dryer when the wet product in the fluidized bed vessel contains what is referred to as 'free solvent'. A second or intermediate regime, referred herein as Regime 2, is an operating mode where the rate of solvent pickup rate is lower that the rate of solvent pickup in Regime 1 and steadily decreases over time. The third regime is referred to as Regime 3 and is the regime or operating mode where the remaining solvent in the product is generally trapped or adsorbed inside the pores of the product. The solvent pickup rate by the fluidizing gas at a given flow rate and temperature is significantly lower than that of that in Regime 1 and unlike Regime 2 remains at a relatively constant level. For most commercial fluidized bed drying processes, Regime 3 often accounts for more than 50% and up to about 80% of the entire batch drying time.

In the preferred embodiments, the volumetric flow rate of the effluent in the solvent recovery and recycle circuit is reduced over time or, more particularly as the fluidized bed system shifts from one regime to the next. In the preferred embodiments, the volume flow of effluent directed through the solvent recovery and recycle loop is generally during operating Regime 1 is between about 10% to about 80% of the effluent stream exiting the FBD. As the fluidized bed system shifts to Regime 2, the volumetric flow of effluent directed through the solvent recovery and recycle loop is further reduced. Finally, as the fluidized bed system shifts to Regime 3 to extract the trapper or adsorbed solvent in the product, the volumetric flow of effluent directed through the solvent recovery and recycle loop is reduced to between about 1% and about 10% of the effluent stream exiting the FBD.

Unexpectedly, it has been found that the overall product drying times for many chemical and pharmaceutical products are not significantly increased because of the solvent load in the fluidizing gas. Recycling a portion of the solvent containing effluent directly to the intake reduces the transient solvent removal load and equipment costs associated with solvent removal in the batch drying process. In addition, recycling a portion of the solvent containing effluent directly back to the intake and combining such solvent containing effluent with purified effluent and make-up fluidizing gas allows product drying to proceed at slightly increased, but acceptable overall drying times.

As indicated above, during a typical batch fluidized bed drying cycle, the first regime occur initially at which the rate of solvent pickup rate (when the powder contains what is termed in the technical literature as "free solvent") is highest, followed by a second regime in which the rate of solvent pickup keeps decreasing, followed by final regime where the solvent removal rate almost levels off, yielding a dry powder. The presently disclosed system and process splits the gas stream leaving the drier at any instant into two streams with the first gas stream being subjected to solvent recovery process and then recycled and the a second gas stream being directly recycled. A portion of either of these two streams may be vented to prevent build up of air in the recycle loop. By adjusting the relative proportion of the split gas stream process and the percentage of gas diverted to the solvent recovery process, the present process allows for the active control of the drying depending on the operating regime.

It is well known that the solvent concentration in the recycling gas influences the drying rate of the particles. Generally, at the start of the batch drying cycle, high solvent concentration in the recycling gas has less impact on the drying rate of the particles due to the high solvent concentration in the particles anyway. Therefore, a smaller portion of the recycle stream should be diverted to the solvent condensation unit. As the batch drying cycle proceeds, however, drier particles require less solvent in the drying gas to maintain proper equilibrium driving force. The higher gas flow to the condensation unit is balanced by lesser solvent with heat of condensation, results in keeping the refrigeration demand relatively unchanged for the cryogenic condenser.

By using the above described optimized gas control strategy, the proportion of the split gas stream can be manipulated with the drying time and controlled to give the optimum fluid bed drying rates and cost of recovering the solvent. As mentioned earlier, realizing that the fluidization gas requirement is generally higher than the gas drying requirements. The higher gas flow-rate not only creates solid attrition, loss of fines, it also cost more to operate the gas recirculating systems. It is therefore possible to run this drying system in the "expanded bed" mode instead of a fully "fluidized bed" mode. A fully fluidized bed would have a gas upward drag force of the gas exceed that of the apparent weight of the particles. Gas "bubbles" and "channels" form inside the fluidized bed with violent mixing of the solid particles inside the fluidized bed. Since the drying process is much slower than the bulk mixing process, the prefer mode of operating this drying process is to run the system as an expanded or partially expanded bed at which the solid has been raised and expanded uniformly without turbulent gas bubbles and channels inside the bed. This allows the much lower fluidizing gas to be used and hence reduce the gas handling and solvent recovery equipment capacity.

The disclosed batch fluidized bed drying system together with the new process gas flow and control strategy is generally effective where the velocities of the fluidizing gas exceeds the minimum fluidization velocity required to suspend the particles in the state of fluidization by at least 30%.

Reducing the effluent flow into the solvent recovery and recycle circuit during the later stages or regimes of the fluidized bed drying process tends to increases the usage efficiency of the liquid nitrogen or other liquefied inert fluidizing gas. Likewise, reducing the effluent flow into the solvent recovery and recycle circuit also reduces the drier pre-entry heat load and some of the costs associated with pre-heating the inert fluidizing gas or influent gas.

Enhanced cooling of the effluent flow in the solvent recovery and recycle loop is an important aspect of the present system and process control strategy. As described in the Example below, to facilitate removal of the solvent from the effluent stream the effluent stream in the solvent recovery and recycle loop is rapidly cooled to a first set point temperature ($T_{SP2}$) during Regime 1 and Regime 2 when the solvent to be removed is mainly the 'free solvent'. Typical set point temperatures ($T_{SP2}$) attained during Regime 1 and/or Regime 2 may be as low as—10° C. or −20° C. depending on the solvent. The means for cooling the incoming effluent stream preferably includes one or more heat exchangers with the cooling flow in the heat exchangers including flow from the liquid nitrogen source. Other cooling means may also be applied.

However, as the fluidized bed drying process progresses, it is advantageous to further cool the effluent stream in the solvent recovery and recycle loop to lower set point temperatures ($T_{SP3}$) when the solvent to be removed is mainly 'trapped solvent'. Typical set point temperatures ($T_{SP3}$) attained during Regime 3 may be as low as −50° C. or lower depending on process conditions and the solvent to be extracted. Such enhanced cooling of the effluent stream in the solvent recovery and recycle loop preferably requires additional liquid nitrogen or perhaps even a multi-stage cooling process. Again, the specific cooling mechanisms and means are highly dependent on the specific process conditions, the solvent to be removed and the product drying requirements.

Figure 2:
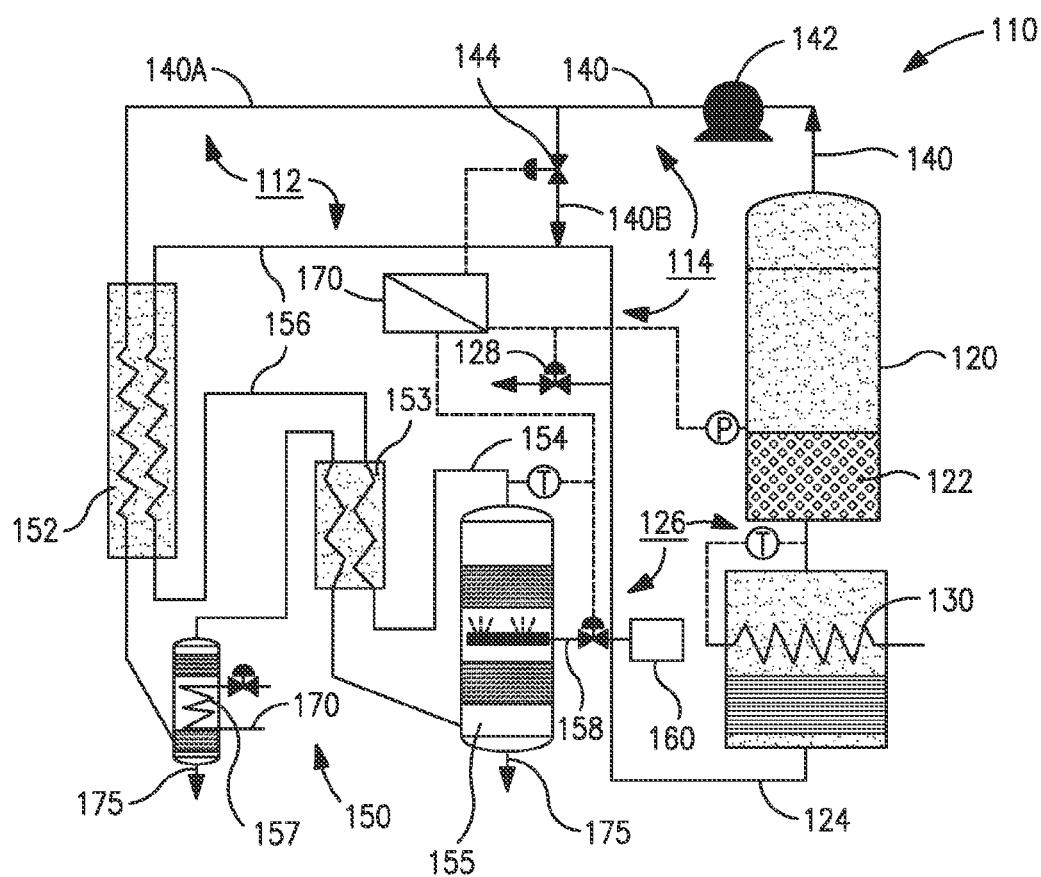
FIG. 2 is a schematic illustration of an alternate embodiment of the fluidized bed system in accordance with the present invention.

Turning now to FIG. 2, there is shown a schematic illustration of an alternate embodiment of the inert gas based batch fluidized bed dryer system. The embodiment of FIG. 2 differs from that of FIG. 1 in that an alternate solvent removal subsystem is presented. As with the embodiment disclosed with reference to FIG. 1, the alternate embodiment also utilizes both a solvent recovery and recycle loop or circuit in conjunction with a direct recycle loop or circuit together with the disclosed process gas flow and control strategy described above.

The illustrated batch fluidized bed system 110 in FIG. 2 includes a fluidized bed vessel 120 adapted to contain a batch of wet solvent-containing product 122. An inert fluidizing gas 124 such as nitrogen is supplied to the fluidized bed vessel 20 via the intake circuit 26. As with the prior embodiment, the conditions in the fluidized bed vessel 20, including pressure, gas flow rate, temperature, etc. are monitored and fed to the system controller (70) to operative control various aspects of the system 110, as described in more detail below. The intake circuit 126 to the fluidized bed vessel 120 includes vent 128 responsive to the pressure in the fluidized bed vessel 120, a heating element 130 adapted to heat the inert fluidizing gas 124 in the intake circuit 126 to a prescribed temperature set point ($T_{SP1}$).

The effluent 140 leaving the fluidized bed vessel 120 via pump 142 is the inert fluidizing gas with a portion of the solvent entrained therein. Upon exiting the fluidized bed vessel 120, the effluent 140 is split into two separate circuits by control valve 144. The first circuit is a solvent recovery and recycle circuit 112 which routes a portion of the effluent 140A to a solvent recovery process or subsystem 150 and subsequently returns the treated or cleansed effluent 152 back to the intake circuit 126. The second circuit is a direct recycle circuit 114 that routes the remaining portion 140B of the solvent containing gas or effluent directly to the intake circuit 126 upstream of the fluidized bed vessel 120. As with the earlier described embodiment, the relative percentages of effluent 140B, 140A flowing to the direct recycle circuit 14 and the solvent recovery and recycle circuit 12, respectively, is operatively controlled by the microprocessor based controller (170) in response to various measured parameters of the fluidized bed system 110 and the stage of the process ongoing in the fluidized bed vessel 120.

The solvent recovery subsystem 150 shown in FIG. 2 preferably includes a multi-stage cooling and solvent recovery process. The illustrated solvent recovery subsystem 150 includes a tri-stage cooling scheme including a first vertical heat exchanger 152 and a second vertical heat exchanger 153 both of which cool the solvent containing effluent stream 140A. The illustrated system also includes a brine cooler 157 interposed between the two vertical heat exchangers that operates to further cool the solvent containing effluent stream 140A and facilitates solvent removal.

The fully cooled effluent stream 154 is then directed to condensing unit 155 where additional solvent is removed. As the solvent condenses out of the cooled effluent stream 154, the cleansed or treated effluent stream 156 together with any make-up gas 158 is recycled to the vertical heat exchangers 152, 153 as the source of cooling and subsequently to the intake circuit 126. As shown, this alternate embodiment purifies and cools a portion of the effluent using a combination of process brine and liquid nitrogen. While the capital costs associated with the multi-stage cooling and purification process are forseeably higher, the total utilization of nitrogen and overall operating costs may be potentially lower depending on the availability of a process brine solution.

EXAMPLE

Consider a hypothetical example using the above-described embodiments of the fluidized bed dryer. For example, if one were interested in batch drying of about 100 kg of wet product containing a given amount of solvent, including 'free solvent' and 'trapped solvent', it is possible to calculate or estimate the overall product drying time.

In this hypothetical example, the selected inert fluidizing medium is high purity nitrogen gas from a liquid nitrogen source with a fluidizing gas flow rate of about 2.40 m³/sec (i.e. 3.12 kg/sec). The temperature at which the fluidizing gas enters the fluidized bed dryer is selected to be about 30° C. The batch of product to be dried is about 100 kg of wet product containing 15 kg of solvent (e.g. acetone), including about 12 kg of 'free solvent' and 3 kg of 'trapped solvent'.

Due to heat loss in the fluidized bed vessel and cooling effects attributable to evaporation of the acetone within the fluidized bed vessel, the estimated temperature of the effluent exiting the fluidized bed vessel is approximated at 28° C. At 28° C., the theoretical mass fraction of nitrogen gas is approximately 0.48 while the theoretical mass fraction of acetone is approximately 0.52 and the flow rate of the acetone is approximately 3.38 kg/second.

The real-time concentration of the solvent (e.g. acetone) in the resulting effluent is lower than the saturation point. The equivalent saturation temperature of this effluent stream is estimated to be about 5° C. where the theoretical mass fraction of $N_2$ would be approximately 0.78 while the theoretical mass fraction of acetone would be approximately 0.22 and the flow rate of the acetone is approximately 0.88 kg/second.

Thus, at 28° C., the relative saturation of acetone in the effluent is estimated to be equal to 0.88/3.88 or about 26%

In the solvent recovery and recycle loop, the solvent containing gas entering the loop is about 26% saturated and at approximately the same temperature as the effluent exiting the fluidized bed vessel or about 28° C. To facilitate removal of the acetone solvent, the stream is cooled using the vertical heat exchanger and the temperature of the solvent containing gas stream exiting the vertical heat exchanger is prescribed at a set point temperature ($T_{SP2}$) of about −10° C. This cooling is achieved using the cooled, purified stream together with make-up nitrogen from a source of liquid nitrogen.

At this set point temperature ($T_{SP2}$) of about −10° C. in the recovery loop, the solvent containing gas stream maintains a theoretical mass fraction of $N_2$ of approximately 0.90 while the theoretical mass fraction of acetone is approximately 0.10 and the flow rate of the acetone at the set point temperature is approximately 0.35 kg/second.

If during the Regime 1 and Regime 2 operating modes, an average of about 10% of the effluent is directed through the solvent recovery and recycle loop, the effective solvent (acetone) removal rate is estimated to be about [0.88 kg/s−0.35 kg/s]*(10%) or about 0.053 kg/sec. At this removal rate, the time needed to remove about 12 kg of solvent (acetone) via condensation is about 903 seconds or about 15 minutes of continuous steady flow assuming a conservative 25% condensate capture efficiency. The 25% condensate capture efficiency is based on the estimation that 75% of the solvent (acetone) escapes as a fine mist. Note that the heat exchanger, the condenser and other equipment in the solvent recovery and recycle loop need only be sized to handle 10% of the flow of the effluent.

In accordance with the present gas process flow and control strategy, the percentage of effluent directed to the solvent recovery and recycle loop is reduced during Regime 3 operating mode when the solvent remaining in the product is essentially 'trapped solvent' that is retained within the pores of the particles constituting the product. In the present hypothetical example, approximately 3 kg of trapped solvent is contained in the 100 kg of product or roughly about 3%. Assuming an equilibrium acetone vapor pressure to be 3% of the saturation level at about 30° C., the driving force is 97% of the inert fluidizing gas. At about 30° C., the acetone vapor pressure is approximately 288.8 mm Hg or about 0.38 mole fraction with an equilibrium solvent vapor pressure of about [(3%)*(0.38)] or about 0.0114 which is the mole fraction equivalent of acetone saturated inert fluidizing gas at about −34° C. The weight fraction at 0.0114 mole fraction is about 97.65% nitrogen and 2.35% acetone with a corresponding mass flow of acetone of about 0.075 kg/sec.

To facilitate the more difficult task of removal of the acetone solvent during Regime 3 of the fluidized bed drying operation, the solvent containing recycle stream is cooled using the vertical heat exchanger(s) with the temperature of the solvent containing gas stream exiting the vertical heat exchanger(s) prescribed at a very low set point temperature ($T_{SP3}$) of about −40° C. This enhanced cooling of the solvent containing effluent stream during Regime 3 is achieved using the very low temperature nitrogen from the source of liquid nitrogen.

At about −40° C., the weight fraction is about 98.5% nitrogen and 1.5% acetone with a corresponding mass flow of acetone of about 0.048 kg/sec. If during the Regime 3 operating modes, an average of only about 5% of the effluent is directed through the solvent recovery and recycle loop, the effective solvent (acetone) removal rate is estimated to be about [0.075 kg/s−0.048 kg/s]*[5%] or about 0.0135 kg/sec.

At this removal rate and 50% condensate capture efficiency, the time needed to remove the final 3 kg of solvent (acetone) via condensation is 74 minutes of continuous steady flow. Thus, the total cycle time to dry the product is estimated to be less than 90 minutes (e.g. 15 minutes drying time for Regime 1/2 plus about 74 minutes drying time for Regime 3).

From the foregoing, it should be appreciated that the disclosed embodiments and examples provides a method and system of solvent recovery in a batch fluidized bed drying process. Such concept is also applicable in any batch fluidized bed operation other than fluidized bed drying, such as when a fluidized bed reaction is being conducted in a batch mode and requires recycling the fluidized gas to maximize its utilization, with simultaneous removal of gas phase products, reactants, contaminants or impurities.

Alternate embodiments of the present system and method included controlling the split recovery streams as described above but further using liquid nitrogen in a heat exchanger for indirect contact cooling of either or both of the split recovery streams and than feed the vaporized and spent nitrogen gas back into the recycling loop as make-up gas. Yet another alternate embodiment contemplates using an active carbon bed or other types of solvent removal technique such as molecular sieve absorbers to remove the solvent in the split stream.

Examples of solvents that may be recovered using the above-identified process include: iso-propyl alcohol;; water; methanol; ethyl acetate; ethyl alcohol; toluene; methylene chloride; hexane; acetone; acetonitrile; chloroform; methyl iso-butyle ketone; methyl iodide; xylene; iso-butyl alcohol; cyclohexane; acetonitrile; tetra-hydro furan; pyrrolidine; di-methyl formamide; poly-propylene glycol; mono-ethylene glycol; formaldehyde; n-butanol; tert-butyle alcohol; etc. and combinations or mixtures thereof. In general, it works for most organic or non-organic solvents used in the industry.

Numerous other modifications, changes, and variations of the present methods and systems including utilization of other known solvent removal or gas purification systems will be apparent to a person skilled in the art and it is to be understood that such modifications, changes, and variations are to be included within the purview of this application and the scope of the instant claims.

What is claimed is:

1. A method of fluidizing a batch of solvent-containing product in a fluidized bed vessel comprising the steps of:
   directing an influent stream containing an inert fluidizing gas through the vessel to fluidize the solvent-containing product and produce an effluent stream of inert fluidizing gas with solvent entrained therein;
   diverting a first portion of the solvent entrained effluent stream to a solvent recovery process;
   cooling the first portion of the solvent entrained effluent stream;
   removing the solvent from the first portion of the solvent entrained effluent stream to form a cleansed effluent stream;
   recycling a second portion of the solvent entrained effluent stream to the influent stream;
   directing the cleansed effluent stream to the influent stream;
   providing a make-up stream of inert fluidizing gas to the cleansed effluent stream or influent stream;
   operatively controlling the flow of the first portion of the solvent entrained effluent stream to reduce the flow of the solvent entrained effluent stream to the solvent recovery process as the batch fluidizing process progresses; and operatively controlling the flow of the make-up stream to the cleansed effluent stream or influent stream to increase the cooling capacity of the first portion of the solvent entrained effluent stream as the batch fluidizing process progresses.

2. The method of claim 1 wherein the method of fluidizing the batch of solvent-containing product in the fluidized bed vessel further comprises a method of drying the batch of solvent-containing product in a fluidized bed vessel.

3. A fluidized bed system comprising:

a fluidized bed vessel adapted to contain a batch of solvent-containing product;

an influent circuit adapted to supply an inert fluidizing gas to the fluidized bed vessel;

an effluent circuit adapted to remove the inert fluidizing gas with solvent entrained therein from the fluidized bed vessel;

a first recycle circuit coupling the effluent circuit to a solvent recovery subsystem and the solvent recovery subsystem to the influent circuit;

a second recycle circuit directly coupling the effluent circuit to the influent circuit;

a flow control valve disposed in the effluent circuit, the first recycle circuit or the second recycle circuit and operatively configured to divide the effluent between the first recycle circuit and the second recycle circuit in response to commands from a controller; and a source of inert fluidizing gas coupled to the first recycle circuit or the influent circuit wherein the controller operatively controls the flow control valve to reduce a flow of effluent through the first recycle circuit as the batch drying process progresses and controls a flow of the source of inert fluidizing gas to the first recycle circuit to increase a cooling capacity of a cooling unit as the batch drying process progresses.

4. The system of claim 3 wherein the solvent recovery subsystem further comprises:

the cooling unit disposed in the first recycle circuit and configured to reduce the temperature of the effluent in the first recycle circuit; and a condensing unit adapted to remove solvent from the flow of effluent in the first recycle circuit.

5. A fluidized bed system comprising:

a fluidized bed vessel adapted to contain a batch of solvent-containing product;

an influent circuit adapted to supply an inert fluidizing gas to the fluidized bed vessel;

an effluent circuit adapted to remove the inert fluidizing gas with solvent entrained therein from the fluidized bed vessel;

a first recycle circuit coupling the effluent circuit to a solvent recovery subsystem and the solvent recovery subsystem to the influent circuit;

a second recycle circuit directly coupling the effluent circuit directly to the influent circuit;

a flow control valve disposed in the effluent circuit and operatively disposed to divide the effluent between the first recycle circuit and the second recycle circuit in response to commands from a controller;

at least one cooling unit disposed in the first recycle circuit and configured to reduce the temperature of the effluent in the first recycle circuit;

a condensing unit adapted to condense solvent from the flow of effluent in the first recycle circuit against a flow of the inert fluidizing gas; and a source of inert fluidizing gas coupled to the first recycle circuit or the influent circuit;

wherein the controller operatively controls the flow control valve to reduce a flow of effluent through the first recycle circuit as the batch drying process progresses; and wherein the controller operatively controls a flow of the source of inert fluidizing gas to the first recycle circuit or the influent circuit to increase the cooling capacity of the at least one cooling unit as the batch drying process progresses.

\* \* \* \* \*